No. 851,600. PATENTED APR. 23, 1907.
J. F. LATIMER.
PROCESS FOR SEPARATING MINERALS.
APPLICATION FILED MAR. 27, 1906.
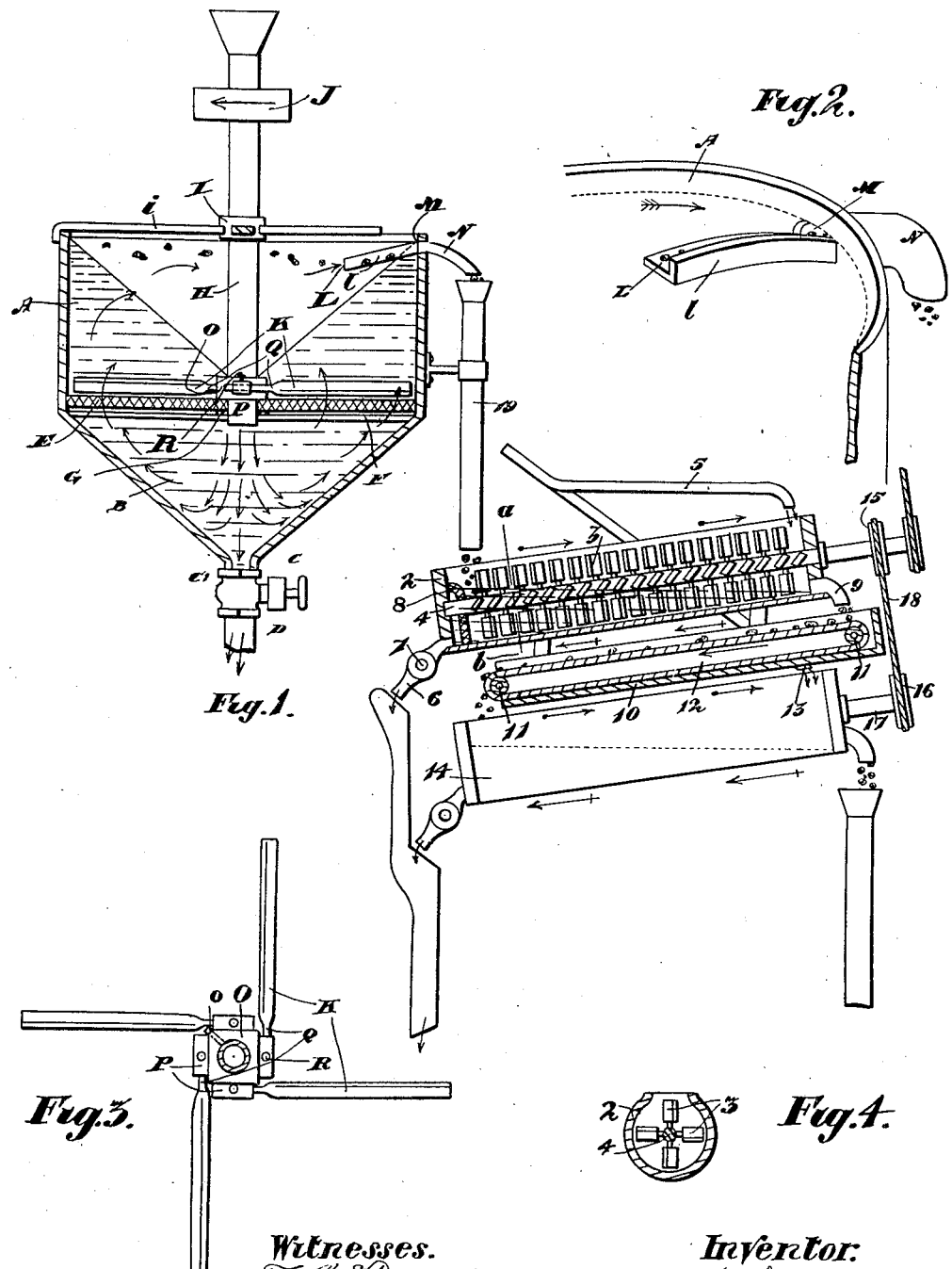
Witnesses.
F. McDermott
L. G. Sharpe
Inventor:
J. F. Latimer,
by Gerton R. Case.
Atty.

UNITED STATES PATENT OFFICE.

JAMES FRANCIS LATIMER, OF TORONTO, ONTARIO, CANADA.

PROCESS FOR SEPARATING MINERALS.

No. 851,600. Specification of Letters Patent. Patented April 23, 1907.

Application filed March 27, 1906. Serial No. 308,346.

*To all whom it may concern:*

Be it known that I, JAMES FRANCIS LATIMER, a subject of the King of Great Britain, residing in the city of Toronto, in the county of York, in the Province of Ontario, Canada, mineralogist, have invented certain new and useful Improvements in Processes for Separating Minerals, of which the following is a specification.

My invention relates to improvements in process for separation and refining of graphite from graphitic material, and molybdenite and other minerals from their gangue when similarly associated, and the objects o my invention are, firstly, to combine the selective action of oil in water with a centrifugal force to separate graphitic and similar minerals from pulverized rocky matter or gangue, thus partly refining the graphite or similar substance, and to complete refining of same by secondly working the graphite or similar substance, against a current of water, the remaining rocky matter or gangue being removed therefrom and passing away by gravity, together with the wash water, and it consists essentially of the steps or operations hereinafter described.

The preferred construction of apparatus which I use is described in the following specification, together with my process.

In my copending application for apparatus for separating minerals, Serial Number 308,345, filed March 27, 1906, I claim the apparatus whereby I am enabled to carry out the process hereinafter described.

Figure 1 is a vertical central section through the major portion of my apparatus. Fig. 2 is an enlarged perspective view of a portion of the apparatus shown in Fig. 1, showing a suitable means for deflecting the partly refined graphite or similar substance through a discharge opening. Fig. 3 is a plan view of the preferred means used for separating in the first instance the rocky matter or gangue from the graphite and similar substances, and Fig. 4 is a cross-section on the line $a-b$, Fig. 1.

In the drawings like characters of reference indicate corresponding parts in each figure.

A is any suitable cylindrical vessel, provided with a funnel-shaped bottom B, with the apex C of which connects a discharge-pipe D.

E is any suitable screen suitably supported within the vessel A and of coarser mesh than the ground or divided rocky matter or gangue. It will of course be understood that this screen fits within said vessel and immediately above the funnel-shaped bottom of same, thus dividing the vessel into two compartments.

F are a number of arms radiating from a central ring G. These arms rest upon the top of the bottom B and form suitable supports for the screen E. As these arms are narrow and few in number, they of course do not interfere with the passage of material through the said screen.

H is a hollow shaft, the lower end of which passes through the screen E and ring G. In order to additionally support this hollow shaft H, I fit over same a collar I provided with a number of radiating arms $i$ which are suitably attached to the vessel A. It will of course be understood that the hollow shaft H is free to turn in the ring G, and the collar I.

Before the pulverized rocky matter or gangue is passed into the vessel A, it is thoroughly mixed with a suitable quantity of oil, and is then afterward thinned to the required consistency with water. Previous to passing the oil-provided rocky matter or gangue into the vessel A, this vessel is partly filled with water, and by means of any suitable pulley J the hollow shaft H is revolved, thus causing the arms or paddles K, suitably attached or secured thereto, to move around therewith. Then the oil - provided rocky matter or gangue is introduced into the vessel near the center thereof, and the valve C' controlling the discharge-pipe D is partly opened, and at the same time water is admitted into the funnel-shaped bottom through the hollow shaft H and in such quantity that a suitable portion will flow up through the screen E as shown by arrows and cause a slight overflow through the discharge-opening at the top of the vessel hereinafter described. The action of the arms or paddles K creates a centrifugal force, thus churning the rocky matter or gangue and water thoroughly so as to separate therefrom the graphite which gradually coheres and is forced to the top of the water. The centrifugal force carries the graphite to the side of the vessel A and to the top of the water, and as I provide a deflecting plate L of suitable construction, the graphite is moved up said plate and through the discharge-opening M at the side of the vessel A near its top with which connects the discharge-pipe N for conveying the partly refined graphite away from said vessel.

The mesh of the screen E is coarser than the rocky matter or gangue, and as the centrifugal force in the compartment above the screen separates the graphite or similar substances therefrom, this rocky matter or gangue passes down through said screen and into the funnel-shaped bottom, whence it is carried away with the wash water through the discharge-pipe D. The water coming into the vessel through the hollow shaft H is of such volume as to maintain the water within said vessel at substantially a constant volume so that the graphite or similar substances separated from the rocky matter or gangue will be at the proper level so as to be deflected into the discharge-pipe N. In other words the amount of water passing through the discharge-pipes D and N is equal to the amount of water fed through the hollow shaft H. The funnel-shaped bottom conveys the refuse rocky matter or gangue directly to the discharge-pipe D and prevents any possibility of the vessel A becoming choked.

It will be noticed that the hollow shaft H is directly above the discharge-pipe D: I preferably so place these parts of my apparatus so that a portion of the feed water will pass directly into said discharge-pipe and insure its being thoroughly flushed.

Although I may use any suitable paddles or other means to create the necessary centrifugal force, I preferably construct these paddles as follows: O is a collar suitably secured to the hollow shaft H as by set screws o. This collar is provided with a number of lugs P provided with horizontal holes in which rest the stems Q of said paddles K. By means of the set-screws R operating in the lugs P, the paddles K are held in the desired position by means of their stems Q. From Figs. 1 and 3, it will be seen that the paddles K are given a slight longitudinal turn so that in their action they will have a tendency to exert an upward force, thus assisting the separation of the graphite from the rocky matter or gangue. By the construction just described, it will be understood that I can adjust said paddles longitudinally, axially, and vertically. The deflecting plate L is shaped so as to fit against the inner side of the vessel A, and as shown in Figs. 1 and 2, it is held at a downwardly-extending angle, thus providing an inclined plane up which graphite or similar substances pass. By providing this deflecting plate L with a side 1, the conveying away of the graphite or similar substances from the vessel A is facilitated.

The partly refined graphite after it leaves the vessel A is passed into a vessel 2. Operating in this vessel are a plurality of paddles or blades 3 suitably secured to a revolving shaft 4. Through the action of the paddles or blades 3 the graphite is worked thoroughly by the different masses being cut by said blades and moved in the direction indicated by arrows with round tails. By means of a water pipe 5, water is introduced into the vessel 2 at the opposite end to where the graphite is introduced thereinto. It will be noticed that the paddles or blades 3 are placed at a suitable angle so that during the operation of the shaft 4 they work or move the graphite against the flow of the water which is indicated by arrows provided with crossed tails. And as the vessel 2 is supported at an angle, the rocky matter or gangue that was not separated from the graphitic substance in the first vessel A, is removed from said graphitic substance and passed by gravity, together with the stream of water, down the bottom of said vessel 2 toward discharge-end of same and out through the discharge-pipe 6. 7 is any suitable cock controlling the flow from said discharge-pipe 6. Over the opening of the discharge-pipe 6 leading from the vessel 2 is any suitable screen 8 of sufficient mesh to permit of the separated rocky matter or gangue passing therethrough. By dotted lines in Fig. 1 will be seen the height at which the water is preferably maintained within the vessel 2. As soon as the graphite has been moved up to the discharge-end of the vessel 2, it is forced thereout through the discharge-pipe 9. In case it should be necessary to further refine the graphite, it is conveyed by any suitable means, (such as an endless belt 10 operating over pulleys 11 in a frame 12) into a second vessel 14 shown immediately below the vessel 2, and is subjected to the same action therewithin as before described, as this vessel 14 is constructed similar to the vessel 2. 13 is any suitable water pipe for feeding water into the vessel 14. By means of the pulleys 15 and 16 secured respectively to the shafts 4 and 17 and the belt 18, the paddles or blades within said vessels 2 and 14 are operated.

The angle at which the blades or paddles 3 are placed is such that they compel the mass of the graphite to move forward and upward to the discharge-pipe 9. The angle at which these blades are placed insures the swath or path of movement of any one blade being overlapped by the swath or path of movement of the blades immediately above or below same, thus insuring thorough working of the masses of graphitic substance.

By means of the second step in the refining of the graphite I am enabled to produce a product from which all of the rocky matter or gangue has been removed.

If desired, I may have any suitable pipe or conduit 19 to direct the graphite passing from the vessel A down into the vessel 2.

By placing the vessel 2 below the vessel

A it will be understood that I utilize gravity for the feeding of the graphite into the said vessel 2.

The pasty mass of graphite after it passes through this apparatus, is then pressed by any suitable means so as to remove water and a portion of the oil, and the remaining portion of the oil is converted into commercial lampblack by combustion in a suitable furnace, or recovered by distillation.

Molybdenit is treated in precisely the same manner as graphite.

I do not confine myself to any particular form of apparatus for carrying out my process.

What I claim as my invention is:

1. The process of separating graphite and similar substances from rocky matter and gangue, consisting in mingling the crushed ore with oil; delivering the oil-provided mass to; and maintaining it in, an upflowing current of water; centrifugally agitating the mass to separate the components and so accelerate the current as to carry the oil-provided graphite to the top of the water; flowing the so separated graphite away; settling the gangue through a current of reduced speed below the zone in which the material is fed and agitated, and removing said gangue by a downwardly-flowing current.

2. The process of separating graphite and similar substances from rocky matter and gangue, consisting in mingling the crushed ore with oil; delivering the oil-provided mass to; and maintaining it in, an upflowing current of water; centrifugally agitating the mass to separate the components and so accelerate the current as to carry the oil-provided graphite to the top of the water; flowing the so separated graphite away; settling the gangue through an upflowing current of reduced speed below the zone in which the material is fed and agitated, and removing said gangue by a downwardly-flowing current.

3. The process of separating graphite and similar substances from rocky matter and gangue, consisting in mingling the crushed ore with oil; delivering the oil-provided mass to; and maintaining it in, an upflowing current of water; centrifugally agitating the mass to separate the components and so accelerate the current as to carry the oil-provided graphite to the top of the water; flowing the so separated graphite away; settling the gangue through an upflowing current of reduced speed below the zone in which the material is fed and agitated, and removing said gangue, below the zone in which the material is fed and agitated, by a downwardly-flowing current of greater speed than said upflowing current of reduced speed.

In testimony whereof I have signed my name to this specification in the presence of two subscribing witnesses.

JAMES FRANCIS LATIMER.

Witnesses:
L. G. SHARPE,
F. McDERMOTT.